(12) United States Patent
Bitterlich

(10) Patent No.: US 8,291,115 B2
(45) Date of Patent: Oct. 16, 2012

(54) METHOD FOR DISTRIBUTION OF SOFTWARE AND CONFIGURATION DATA AND CORRESPONDING DATA NETWORK

(75) Inventor: Jean-Yves Bitterlich, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 795 days.

(21) Appl. No.: 11/662,238

(22) PCT Filed: Sep. 22, 2005

(86) PCT No.: PCT/EP2005/054749
§ 371 (c)(1),
(2), (4) Date: Mar. 8, 2007

(87) PCT Pub. No.: WO2006/034990
PCT Pub. Date: Apr. 6, 2006

(65) Prior Publication Data
US 2007/0266175 A1    Nov. 15, 2007

(30) Foreign Application Priority Data
Sep. 29, 2004 (DE) .......................... 10 2004 047 371

(51) Int. Cl.
*G06F 15/16* (2006.01)
*G06F 15/173* (2006.01)
*G06F 15/167* (2006.01)
(52) U.S. Cl. ......... 709/243; 709/227; 709/216; 709/248
(58) Field of Classification Search .......... 717/168–178; 709/201–203, 213–219, 238–244
See application file for complete search history.

(56) References Cited

U.S. PATENT DOCUMENTS

| 5,909,437 | A | 6/1999 | Rhodes et al. |
| 6,138,153 | A * | 10/2000 | Collins et al. .................. 709/221 |
| 6,378,069 | B1 | 4/2002 | Sandler et al. |
| 2002/0059400 | A1* | 5/2002 | Ikami et al. .................... 709/219 |
| 2003/0022663 | A1 | 1/2003 | Rajaram et al. |
| 2003/0033525 | A1 | 2/2003 | Rajaram |
| 2003/0064717 | A1 | 4/2003 | Rajaram |

FOREIGN PATENT DOCUMENTS

| DE | 103 19 317 A1 | 12/2004 |
| DE | 103 53 851 A1 | 6/2005 |
| EP | 1 347 623 A1 | 9/2003 |
| WO | WO 99/65201 A | 12/1999 |
| WO | WO 00/42795 A1 | 7/2000 |
| WO | WO 02/052787 A2 | 7/2002 |
| WO | WO 02/078284 A2 | 10/2002 |

OTHER PUBLICATIONS

Seung-Seok Kang et.al. "Efficient Mobile Access to Internet Data via a Wireless Peer-to-Peer Network": Proceedings of the Second IEEE Annual Conference on Mar. 14-17, 2004, pp. 197-205, XP010689683.

* cited by examiner

*Primary Examiner* — Ian N Moore
*Assistant Examiner* — Afshawn Towfighi

(57) ABSTRACT

In one aspect, software or configuration data that is to be distributed is subdivided into data blocks and a list created based on the data blocks created. Users receive the list and a portion of the data blocks. The users form ad hoc networks or P2P connections among themselves. The connections allow the data blocks to be exchanged randomly.

15 Claims, 1 Drawing Sheet

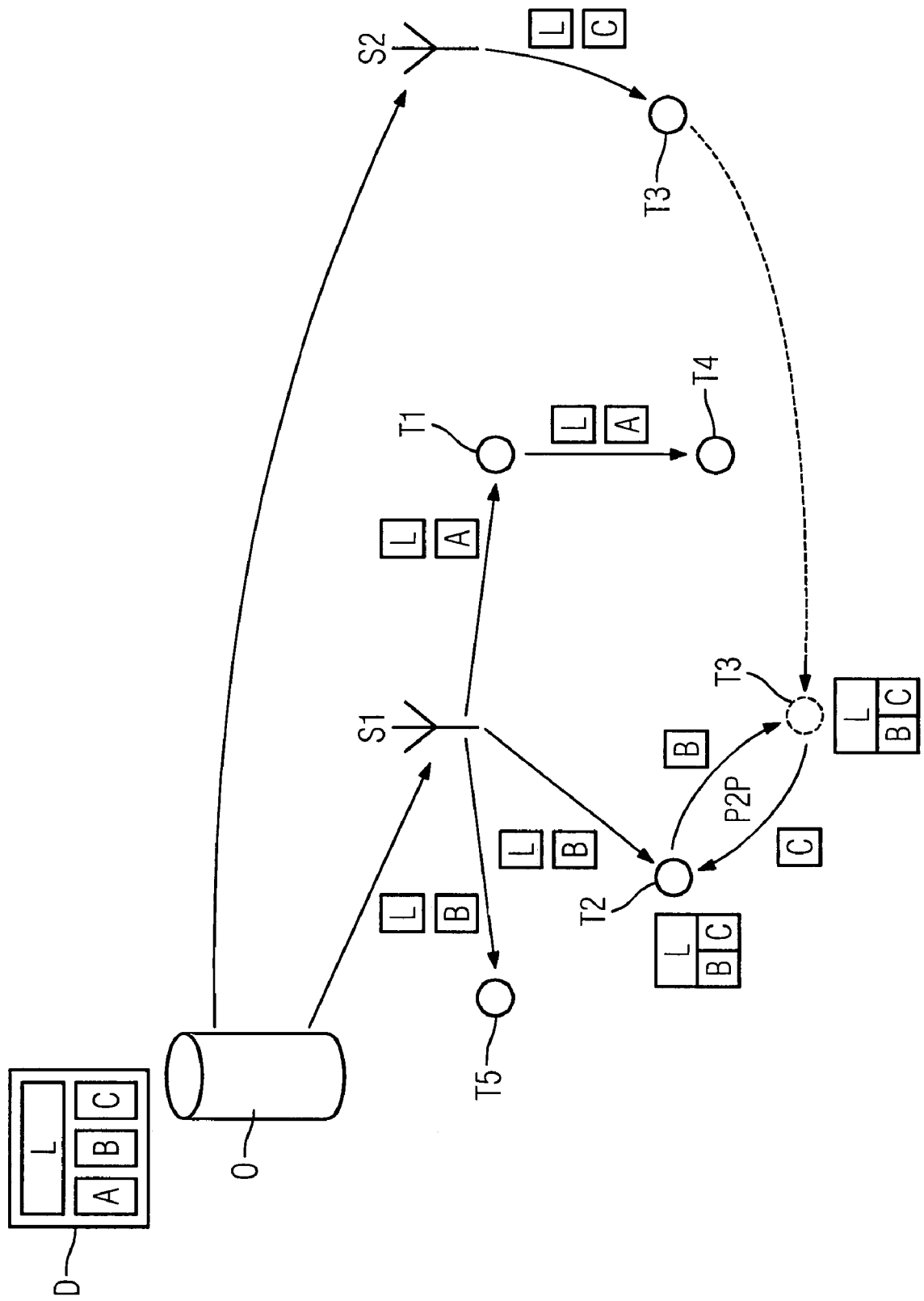

METHOD FOR DISTRIBUTION OF SOFTWARE AND CONFIGURATION DATA AND CORRESPONDING DATA NETWORK

CROSS REFERENCE TO RELATED APPLICATIONS

This application is the US National Stage of International Application No. PCT/EP2005/054749, filed Sep. 22, 2005 and claims the benefit thereof. The International Application claims the benefits of German application No. 102004047371.4 DE filed Sep. 29, 2004, both of the applications are incorporated by reference herein in their entirety.

FIELD OF INVENTION

The present invention relates to a method for distribution of software and/or configuration data in a data network with a number of users who have ad hoc-networking capabilities. In addition the present invention relates to a corresponding data network with users who have ad-hoc networking capabilities and a central device for distribution of the software or configuration data.

BACKGROUND OF INVENTION

Software administration plays a central role for any mobile radio network provider or network operator. With several million users the providers or operators are confronted with an enormous problem: The changing and updating of configurations is to be able to be undertaken at all terminals simultaneously or within a clearly defined time frame. While the standards bodies concentrate on how the updating and modification of the configuration code is to be managed on the network side and on terminal side, the process to be employed by network providers and operators for handling the multiplicity of triggers and connections for updates and changes has basically been left open.

"Efficient mobile access to Internet data via wireless peer-to-peer network", Pervasive Computing and Communications, 2004, Proceedings of the second IEEE Annual Conference on Mar. 14-17, 2004, XP-A-10689683, describes a network structure in which game programs, MP3 files or movie clips for example are transmitted in Internet files or files by content providers via their ISPs and subsequently via 3G connections to the mobile terminals. In this case the respective file is divided up into part files and each of the part files is transmitted to an assigned mobile terminal. Furthermore the mobile terminals are constructed so that they can transfer the remaining subfiles via an ad-hoc network in each case. To this end servers are provided between the Internet and the ad-hoc network in which the distribution of the subfiles in the ad-hoc network is controlled.

In WO-A-02/052787 a device and a method for a transmission of a message broken down into n segments and the re-assembly of the message from one device to another device over a network is described. In this case the n segments are assigned n identifiers, with each segment being transmitted along with its assigned identifier to the other device. The message is assembled with the aid of the n identifiers.

SUMMARY OF INVENTION

An object of the present invention is thus to provide a method with which an update or change of the configurations of a plurality of terminals can be undertaken more easily. In addition a corresponding data network is to be specified.

In accordance with the invention this object is achieved by a method of distributing software and/or configuration data in a data network with a number of users who have ad hoc-networking capabilities by dividing up the software and/or configuration data to be distributed into at least a first and a second data block, creating a list which reflects a complete set of data blocks which is produced during the division. sending the first data block together with the list from a central location to a first of the number of users and the at least second data block together with the list likewise from a central location to a second of the number of users, establishing spontaneous communication between the first and second user and sending the second data block together with the list from the second user to the first user.

In addition there is provision according to the invention for a data network with at least one first and one second user who have ad hoc networking capabilities, and a central device for distributing software and/or configuration data, with the software and/or configuration data to be distributed being available in at least one first and one second data block; a list being created in the central device which reflects a complete set of data blocks produced during the division, the first data block together with the list being able to be sent by the central device to the first user and the second data block together with the list to the second user, spontaneous communication being able to be established between the first and second user and the second data block together with the list being able to be sent directly from the second user to the first user.

Advantageously this makes it possible for the network providers and operators to no longer have to trigger all devices or users for updating and changing the configurations or software. They merely have to send software or configuration data to a subset of users. This saves energy and bandwidth and thereby money, specifically, by dividing up the configuration data to be transmitted into data blocks, around one third of the distribution costs can be saved compared to a standard P2P (peer-to-peer) software distribution.

The second data block can be sent by the second user at the request of the first user. In this case the first user, who is still missing the second data block, is the active part. An especially efficient method of doing this is for the first user to make their request on the basis of the list, which they have obtained from the central location, to the user forming an ad-hoc network with them.

The second data block can however also be transmitted automatically by the second user, if they establish communication with the first user or set up the ad-hoc network. This means that in this case the second user is the active part and the first user merely has to decide whether they already have the second data block and discard it if necessary.

As soon as one of the number of users has a complete set of data blocks available, their installation or setup can be started. The user can establish on the basis of the list transferred by the central location whether the set of data blocks is complete or not.

Spontaneous communication can be established using Bluetooth or WLAN. This allows the process to be based on known standards.

BRIEF DESCRIPTION OF THE DRAWINGS

The present invention will now be explained in greater detail with reference to the enclosed drawings, which basically reflect an inventive data network.

FIG. 1 illustrates an exemplary embodiment of a mobile radio network with users T1, T2 and T3 to be newly configured.

DETAILED DESCRIPTION OF INVENTION

The exemplary embodiment described in greater detail below represents a preferred embodiment of the present invention.

The inventive solution is based on a P2P software management distribution principle with part delivery. In this case large volumes of data needed for the updating or changing of the software or configuration are divided up into blocks which are then sent to "selected" devices. To this end only one data block is sent to a device in each case.

In the example shown in the Figure, the operator 0 provides a data set D with which the users T1, T2 and T3 of a mobile radio network are to be newly configured. In this case, the data of the data set D is subdivided into blocks A, B and C. Furthermore the data set D possess a list L which contains a script about all the data blocks A, B and C to be received by the users.

Operator 0 now sends the individual data blocks A, B and C via send stations S1 and S2 to the users T1, T2 and T3. Data is also sent to user T5 from send station S1.

In the actual example the send station S1 sends a data block A including the list L to the user T1. Furthermore the send station S1 sends a data block B including list L to a user T2. The other send station S2 sends a data block C including list L to a user T3. The restriction to a few users and send stations is based on a purely arbitrary selection. Basically any number of send stations and users can be selected.

In addition the send station S1 also transmits to a user T5 the data block B including list L. Using spontaneous communication the user T1 also forwards the data block A with list L received from the send station S1 to user T4. In this way the data can not only be transported onwards via the send stations S1 and S2, but also, in a similar manner to the virus dissemination principle, between the users themselves.

Since the users who have received new data also received a list providing information about all the necessary data blocks, the users also know which data blocks they still do not have. In order however not to occupy the data network unnecessarily with the forwarding of configuration data, an additional dissemination mechanism is provided in accordance with the invention. If namely a user moves towards another user (in the example shown in the figure user T3 is moving towards user T2) the two users, if they are at an appropriate distance from each other, can establish an ad-hoc-network or a P2P connection via Bluetooth or WLAN. The configuration data blocks can then be exchanged via this communication connection. In the case shown here user T2 sends data block B to user T3 and user T3 sends data block C to user T2. This is done either by user T3 issuing data block C automatically if a P2P connection is established to another user. In the same way user T2 could automatically issue data block B if this P2P connection is established to another user.

Alternately each user can make use of the list L since they know from this list the data blocks which they do not yet have for a complete set of configuration data. In the present example this would mean user T2 asking user T3 whether they have data block A or C available. Since user T3 possesses data block C, they send data block C to user T2. The same applies to the transmission of data block B from user T2 to user T3. Finally the two users T2 and T3 each have the two data blocks B and C. It is then only necessary to wait until one of the two users T2 and T3 is in contact with user T1 or T4 for example, so that they can obtain the remaining data block A.

This dissemination of data blocks for configuration or other software updating means that less of a load is imposed on the data network, so that less bandwidth is necessary for software management. The transmission of the data blocks is guaranteed instead by ad-hoc connections between the terminals. This principle is of especial interest for large volumes of data to be distributed cost-effectively.

The invention claimed is:

1. A method for distributing data in a data network comprising a central device and a plurality of users configured to communicate with the central device, the users having ad hoc-networking capabilities, the users comprising a first user and a second user, the method comprising:
   dividing, by the central device, the data to be distributed into a plurality of data blocks, the data blocks comprised of a first data block and a second data block;
   creating, by the central device, a list reflecting a complete set of the data blocks produced during the division of the data;
   sending, by the central device, the first data block and the list from a central location to the first user;
   sending, by the central device, the second data block and the list from the central location to the second user;
   randomly establishing, by the first user or the second user, a spontaneous communication between the first user and the second user; and
   sending, by the second user, the second data block and the list to the first user; and
   wherein the data is software or configuration data and wherein a communication path is randomly established by occurring without any temporal schedule and without any of: (a) the central device and (b) a predefined terminal overseeing formation of the communication path to ensure transmission of the second data block to the first user and wherein the communication path is spontaneously formed by being formed when the first user is within a predetermined distance of the second user without any schedule defining when the first user would be within the predetermined distance of the second user.

2. The method as claimed in claim 1, wherein the second data block is sent in response to a request by the first user.

3. The method as claimed in claim 2, wherein the request is made based on the list.

4. The method as claimed in claim 3, wherein the first user determines from the list that a data block was not received by the first user and wherein the request includes information relating to the data block that was not received.

5. The method as claimed in claim 1, wherein the second data block is sent automatically by the second user after the establishment of the spontaneous communication with the first user.

6. The method as claimed in claim 1, further comprising starting an installation or a setup when a user from the plurality of users has received a complete set of the data blocks.

7. The method of claim 1 wherein the spontaneous communication is established using Bluetooth or WLAN.

8. A data network having a plurality of users comprised of a first user and a second user, comprising:
   a central device for distributing data, the central device configured to divide the data into a plurality of data blocks comprised of a first data block and a second data block and also to create a list reflecting a complete set of the data blocks produced from dividing the data; and
   the central device configured to send the first data block and the list to the first user and the central device configured to send the second data block and the list to the second user such that the second user is configured to transmit the second data block and the list to the first user via a communication path randomly and spontaneously established between the first and second users after the central device transmitted the first data block and the list to the first user and the second data block and the list to the second user; and wherein the data is software or configuration data and wherein the communication path is randomly established by occurring without any temporal schedule and without any of: (a) the central device and (b) a predefined terminal overseeing formation of the communication path to ensure transmission of the second data block to the first user and wherein the communication path is spontaneously formed by being formed when the first user is within a predetermined distance of the second user without any schedule defining when the first user would be within the predetermined distance of the second user.

9. The data network as claimed in claim 8, wherein the second user is configured such that the transmission of the second data block and the list by the second user is in response to a request by the first user.

10. The data network as claimed in claim 9, wherein the request is made based on the list.

11. The data network as claimed in claim 10, wherein the first user is configured to determine from the list that a data block was not received by the first user and wherein the request comprises information relating to the data block that was not received.

12. The data network as claimed in claim 8, wherein the second data block is transmitted automatically by the second user to the first user.

13. The data network as claimed in claim 8, wherein a user is configured to initiate an installation or a setup after that user received a complete set of the data blocks.

14. The data network as claimed in claim 8, wherein the communication path between the first and second users is established using Bluetooth or WLAN.

15. An apparatus for distributing data to a plurality of users in a data network, the users comprised of a first user and a second user, the apparatus comprising:

a central device for distributing data, the central device configured to divide the data into a plurality of data blocks comprised of a first data block and a second data block and also to create a list reflecting a complete set of the data blocks produced from dividing the data; and the central device configured to send the first data block and the list to the first user and the central device configured to send the second data block and the list to the second user enabling the second user to transmit the second data block to the first user via a communication path randomly and spontaneously established between the first and second users after the central device transmitted the first data block and the list to the first user and the second data block and the list to the second user; and the communication path being randomly established by occurring without any temporal schedule and without any of: (a) the central device and (b) a predefined terminal overseeing formation of the communication path to ensure transmission of the second data block to the first user and wherein the communication path is spontaneously formed by being formed when the first user is within a predetermined distance of the second user without any schedule defining when the first user would be within the predetermined distance of the second user.

* * * * *